United States Patent Office 2,779,375
Patented Jan. 29, 1957

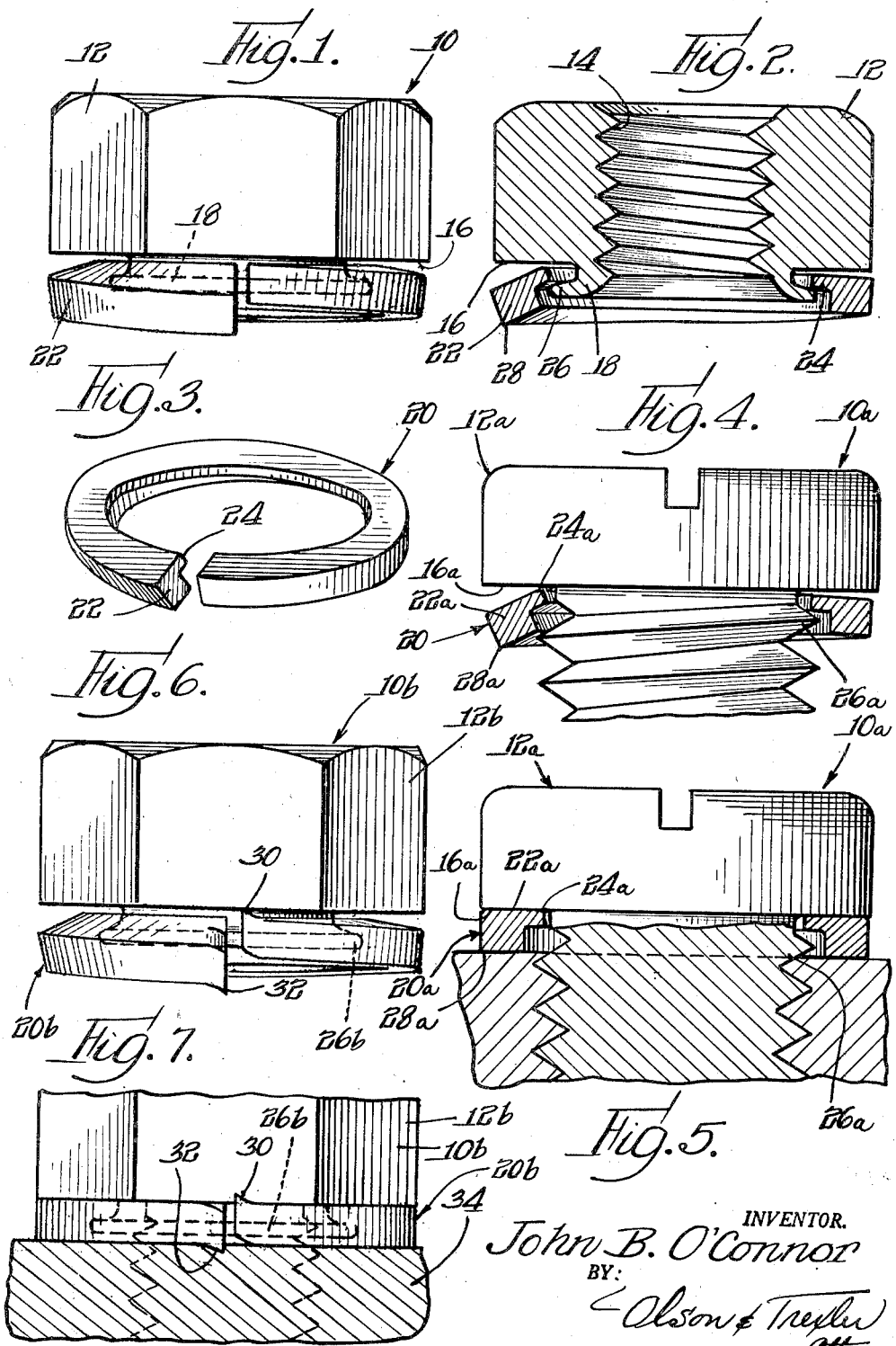

2,779,375

SPLIT WASHER HAVING ONE HELICAL MARGIN AND ONE PLANAR MARGIN ADAPTED TO BE SECURED TO THREADED FASTENER

John B. O'Connor, Glenview, Ill., assignor to Illinois Tool Works, Chicago, Ill., a corporation of Illinois Application May 4, 1955, Serial No. 506,012

7 Claims. (Cl. 151—37)

The present invention relates to a novel preassembled fastener unit, and more particularly to a fastener unit including a threaded member such as a nut or a screw and a split ring type lock washer.

An object of the present invention is to provide a novel preassembled fastener unit including a rotary threaded member and a split ring lock washer which are interconnected so as to preclude axial separation while at the same time permitting axial collapsing of the washer body to provide a locking force when the unit is clamped against a work piece.

A further object of the present invention is to provide a novel preassembled fastener unit of the above described type which is constructed so as to permit the fastener member and lock washer to rotate freely relative to each other during initial tightening of the unit against a work piece, and to provide improved resistance to unauthorized retrograde movement of the fastener member after the unit has been fully tightened against the work piece.

Other objects and advantages of the present invention will become apparent from the following description and the accompanying drawings, wherein:

Fig. 1 is an elevational view of a fastener unit embodying the principles of this invention;

Fig. 2 is a sectional view of the novel fastener unit of this invention;

Fig. 3 is a perspective view showing the split ring lock washer incorporated in the assembly of this invention;

Fig. 4 is a partial sectional view showing the lock washer applied to a screw member.

Fig. 5 is a partial sectional view showing the unit of Fig. 4 applied to a work piece;

Fig. 6 is an elevational view showing a slightly modified form of the present invention; and Fig. 7 is a fragmentary view partially in cross-section showing the unit of Fig. 6 clamped against a work piece.

Referring now more specifically to the drawing wherein like parts are designated by the same numerals throughout the various figures, a fastener unit 10 embodying the principles of this invention is shown in Figs. 1, 2 and 3. The unit 10 includes a nut member 12 having a threaded bore 14 and a radially extending clamping face 16. An annular skirt 18 depends from the clamping face 16 for the purpose mentioned below.

The unit 10 also includes a split ring lock washer 20 having a body portion 22 with a generally rectangular radial cross-section as shown best in Fig. 2. An annular flange 24 integral with the washer body projects radially inwardly from the inner margin of the washer body and overlies an outwardly swaged annular end portion 26 of the skirt 18. Thus the skirt and the flange 24 cooperate to preclude axial disassembly of the nut and lock washer. It should be noted that the axial thickness of the flange 24 is substantially less than the thickness of the body member 22 and is also less than the distance between the swaged end 26 of the skirt and the clamping face 16 so that the lock washer may rotate freely relative to the nut. In addition the axial outer edge of the radially swaged skirt portion 26 is spaced from the clamping surface 16 a distance which is not greater than the thickness of the washer body 22, so that the skirt will not interfere with the locking action of the washer.

The washer body 22 is partially helically disposed so that it will provide a progressively increasing locking pressure as the unit is clamped against a work piece. More specifically, the outer peripheral margin 28 of the washer body is helically disposed in the manner shown, but at the same time it should be noted that the inner margin of the washer body is formed so that the flange 24 lies substantially in a single plane. As a result, the corners of the flange 24 are respectively disposed in single planes and provide bearing edges engageable with the nut member in a manner which permits the nut member and lock washer to rotate freely during initial clamping of the unit against the work. Preferably the corners of the flange 24 and the end of the skirt portion 26 are rounded so as further to facilitate free relative rotation between the nut and the lock washer during initial tightening of the unit against the work. The body portion 22 of the lock washer is given the shape described above and shown in the drawings by progressively twisting the outer margin of the body axially away from the clamping face of the nut. This structure provides the washer body with high resistance to collapsing, or in other words the washer body is very stiff and when collapsed will exert a relatively high pressure for locking the nut member against unauthorized retrograde movement.

Figs. 4 and 5 show a fastener unit 10a which is similar to the above described structure as indicated by the application of identical reference numerals with the suffix "a" added to corresponding elements. The unit 10a differs in that the nut member described above is replaced by a screw member 12a. A thread convolution 26a on the screw shank serves in place of the above described skirt to cooperate with the flange 24a on the lock washer to prevent axial separation between the screw member and lock washer.

In Figs. 6 and 7 there is shown a fastener unit 10b which is similar to the unit 10 described above as indicated by the application of identical reference numerals with the suffix "b" added to corresponding elements. This embodiment differs only in that the ends of the split ring washer are provided with axially extending tooth elements 30 and 32, respectively, for positively digging into the nut member and a work piece 34 as shown in Fig. 7 and thereby increase the locking efficiency of the washer.

From the above description it is seen that the present invention has provided a novel preassembled fastener unit which satisfies the objects heretofore set forth. More specifically, it is seen that the present invention has provided a unit including a threaded rotary fastener member and a split ring type lock washer which are interconnected so as to preclude axial separation thereof. It is further seen that the present invention has provided a fastener unit wherein the split ring washer is initially freely rotatable relative to the fastener member and yet has improved locking characteristics.

While the preferred embodiments of the present invention have been shown and described herein, it is obvious that many structural details may be changed without departing from the spirit and scope of the appended claims.

The invention is claimed as follows:

1. A preassembled fastener unit comprising a threaded rotary fastener member having a washer clamping face and integral radially projecting retaining means spaced axially from said clamping face, and a lock washer including an axially resilient split ring body member of uniform cross section and substantially uninterrupted radially throughout its length, one circumferential margin of the washer body overlying said retaining means for preventing axial separation of the threaded fastener and washer, said margin being positioned in a plane substantially normal to the washer axis, and the other margin of the washer being helically disposed and projecting axially beyond said retaining means in position for resiliently and clampingly engaging a complementary work surface.

2. A split ring type lock washer adapted to be accommodated by the clamping side of a rotary threaded fastener having washer retaining means spaced axially from and formed integral therewith, said washer including an axially resilient split ring body member of uniform cross section throughout its length, said body being progressively circumferentially twisted so as to present a helically disposed margin for resilient and clamping engagement with a complementary work surface when tightened thereagainst, and flange means projecting from the opposite margin of said body in position to be accommodated by a washer retaining means of a rotary threaded fastener, said flange means being positioned in a substantially common plane extending substantially normal with respect to the washer axis and having an axial thickness less than the thickness of said washer body whereby to assure exposure of the helical margin of the washer body in position for operative engagement with a work surface when said washer is associated with the clamping side of a rotary threaded fastener.

3. A preassembled fastener unit comprising a threaded rotary fastener member having a radially extending clamping face and integral radially projecting retaining means spaced axially outwardly from said clamping face, and a lock washer including a split ring body member disposed adjacent said clamping face, integral means disposed substantially in a single plane substantially normal to the axis of the washer and projecting radially from one margin of said body member and overlying said retaining means for preventing axial separation of the fastener member and the lock washer, said body member being progressively twisted around its circumference with said one margin being disposed substantially in a single plane substantially normal to the axis of the washer and substantially the entire opposite margin of the body member being helically disposed.

4. A preassembled fastener unit comprising a threaded rotary fastener member having a radially extending clamping face and integral substantially radially projecting retaining means spaced a predetermined distance axially outwardly from said clamping face, and a lock washer including a split ring body member disposed adjacent said clamping face, integral flange means disposed substantially in a single plane substantially normal to the axis of the washer and projecting radially from one margin of said body member and overlying said retaining means for preventing axial separation of the fastener member and lock washer, said flange means having an axial thickness less than the distance between said clamping face and said retaining means, said washer being freely rotatable relative to said fastener member, said body member being progressively circumferentially twisted about said one margin and having substantially its entire opposite margin helically disposed.

5. A preassembled fastener unit comprising a threaded rotary fastener member having a radially extending clamping face and integral generally radially projecting retaining means spaced axially outwardly from said clamping face, and a lock washer including a split ring body member disposed adjacent said clamping face, integral means disposed substantially in a single plane substantially normal to the axis of the washer and projecting radially from one margin of said body member and overlying said retaining means for preventing axial separation of the fastener member and lock washer, said body member being progressively circumferentially twisted about said one margin and having substantially its entire opposite margin helically disposed, and integral tooth elements projecting generally axially inwardly and outwardly with respect to said clamping face for respectively engaging the clamping face and a work piece.

6. A preassembled fastener unit comprising a threaded nut member having a radially extending clamping face and an integral skirt extending axially outwardly from the clamping face and having a generally radially projecting portion spaced axially outwardly from the clamping face, and a lock washer including a split ring body member disposed adjacent said clamping face, integral means disposed substantially in a single plane substantially normal to the axis of the washer and projecting radially from one margin of the body member and overlying said generally radially projecting portion of the skirt for preventing axial separation of the nut member and lock washer, said body member being progressively circumferentially twisted about said one margin and having substantially its entire opposite margin helically disposed.

7. A preassembled fastener unit comprising a threaded screw member having a radially extending clamping face, a shank extending from the clamping face, and helical thread convolutions on the shank, one of said convolutions being disposed adjacent to and spaced axially outwardly from said clamping face, and a lock washer including a split ring body member disposed adjacent said clamping face, integral means disposed substantially in a single plane substantially normal to the axis of said washer and projecting radially from one margin of said body member and overlying said one thread convolution for preventing axial separation of the screw member and lock washer, said body member being progressively circumferentially twisted about said one margin and having substantially its entire opposite margin helically disposed.

References Cited in the file of this patent

UNITED STATES PATENTS

| | | |
|---|---|---|
| 329,738 | Harvey | Nov. 3, 1885 |
| 517,185 | Carpenter | Mar. 27, 1894 |
| 1,611,210 | Liddell | Dec. 21, 1926 |
| 1,847,314 | Stoll | Mar. 1, 1932 |
| 1,883,068 | Stoll | Oct. 18, 1932 |
| 1,966,427 | Berge | July 17, 1934 |
| 2,424,208 | Poupitch | July 15, 1947 |

FOREIGN PATENTS

| | | |
|---|---|---|
| 331,682 | Great Britain | July 10, 1930 |